US010650079B2

(12) United States Patent
Jindal et al.

(10) Patent No.: US 10,650,079 B2
(45) Date of Patent: May 12, 2020

(54) RESOURCE CACHE CLASSIFICATION USING MACHINE LEARNING

(71) Applicant: Cisco Technology, Inc., San Jose, CA (US)

(72) Inventors: Shubham Jindal, Bangalore (IN); Nandakumar Devi, Bangalore (IN); Kunal Minda, Bangalore (IN); Vaibhav Tripathi, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 371 days.

(21) Appl. No.: 15/800,202

(22) Filed: Nov. 1, 2017

(65) Prior Publication Data

US 2019/0130045 A1 May 2, 2019

(51) Int. Cl.
*G06F 17/30* (2006.01)
*G06F 16/958* (2019.01)
*G06F 15/173* (2006.01)
*G06N 20/00* (2019.01)

(52) U.S. Cl.
CPC ...... *G06F 16/972* (2019.01); *G06F 15/17331* (2013.01); *G06N 20/00* (2019.01)

(58) Field of Classification Search
CPC .. G06F 16/972; G06F 15/17331; G06N 20/00
See application file for complete search history.

(56) References Cited

U.S. PATENT DOCUMENTS

| 9,106,607 | B1* | 8/2015 | Lepeska | G06F 16/9574 |
| 9,912,718 | B1* | 3/2018 | Lepeska | H04L 67/02 |
| 10,372,780 | B1* | 8/2019 | Lepeska | H04L 67/2852 |
| 2011/0035753 | A1* | 2/2011 | Palczak | G06F 11/3688 718/104 |
| 2011/0167063 | A1* | 7/2011 | Tengli | G06F 7/00 707/737 |
| 2016/0226969 | A1* | 8/2016 | Holland | H04L 67/1076 |
| 2016/0328485 | A1* | 11/2016 | Dodonov | G06F 16/9574 |
| 2017/0168959 | A1* | 6/2017 | Dodonov | G06F 12/126 |

\* cited by examiner

*Primary Examiner* — Jared M Bibbee
(74) *Attorney, Agent, or Firm* — Behmke Innovation Group LLC; James M. Behmke; Jonathon P. Western

(57) ABSTRACT

In one embodiment, techniques herein determine a plurality of resources loaded during rendering of a web page on a client device, and determine a duration of time taken for each of the plurality of resources to fully load. Accordingly, the techniques herein may then cluster the plurality of resources into clusters, comprising a first cluster consisting of resources having the shortest durations of the plurality of resources and a second cluster consisting of resources having the longest durations of the plurality of resources. Those resources of the first cluster may then be classified as cached resources, while those resources of the second cluster may be classified as non-cached resources.

21 Claims, 9 Drawing Sheets

RESOURCE CACHE CLASSIFICATION USING MACHINE LEARNING

TECHNICAL FIELD

The present disclosure relates generally to computer networks, and, more particularly, to resource cache classification using machine learning.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In particular, a web browser, while rendering a web page, fetches its resources (e.g., css, javascript, images, etc.) either over the network or from its local cache. However, due to security concerns as well as limitations in certain web browsers, it can be difficult to determine whether a resource is being fetched from the browser's cache or not. Accordingly, this lack of visibility makes it correspondingly difficult to detect and manage inefficiencies in resource caching.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
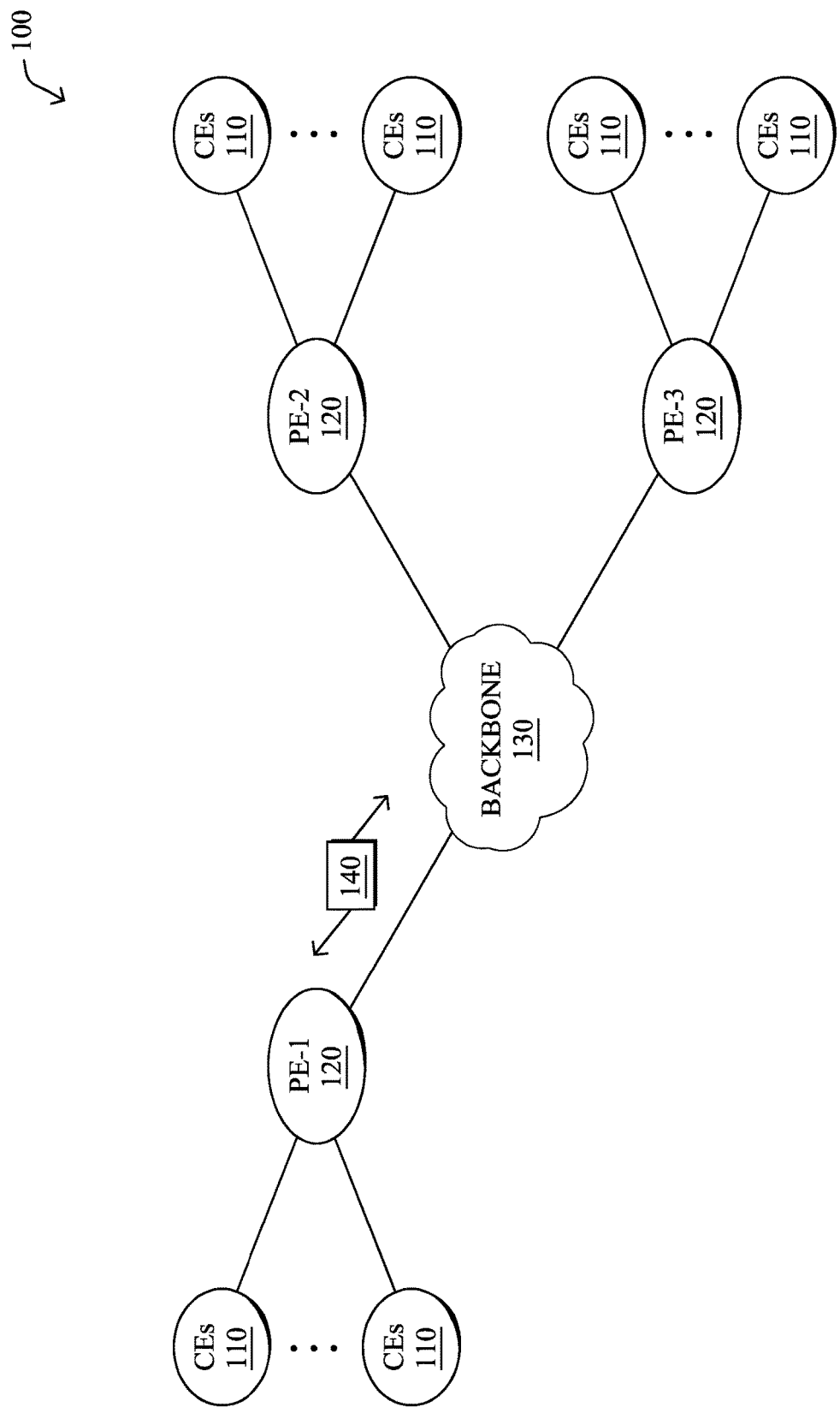
FIGS. 1A-1B illustrate an example computer network.

According to one or more embodiments of the disclosure, techniques herein determine a plurality of resources loaded during rendering of a web page on a client device, and determine a duration of time taken for each of the plurality of resources to fully load. Accordingly, the techniques herein may then cluster the plurality of resources into clusters, comprising a first cluster consisting of resources having the shortest durations of the plurality of resources and a second cluster consisting of resources having the longest durations of the plurality of resources. Those resources of the first cluster may then be classified as cached resources, while those resources of the second cluster may be classified as non-cached resources.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
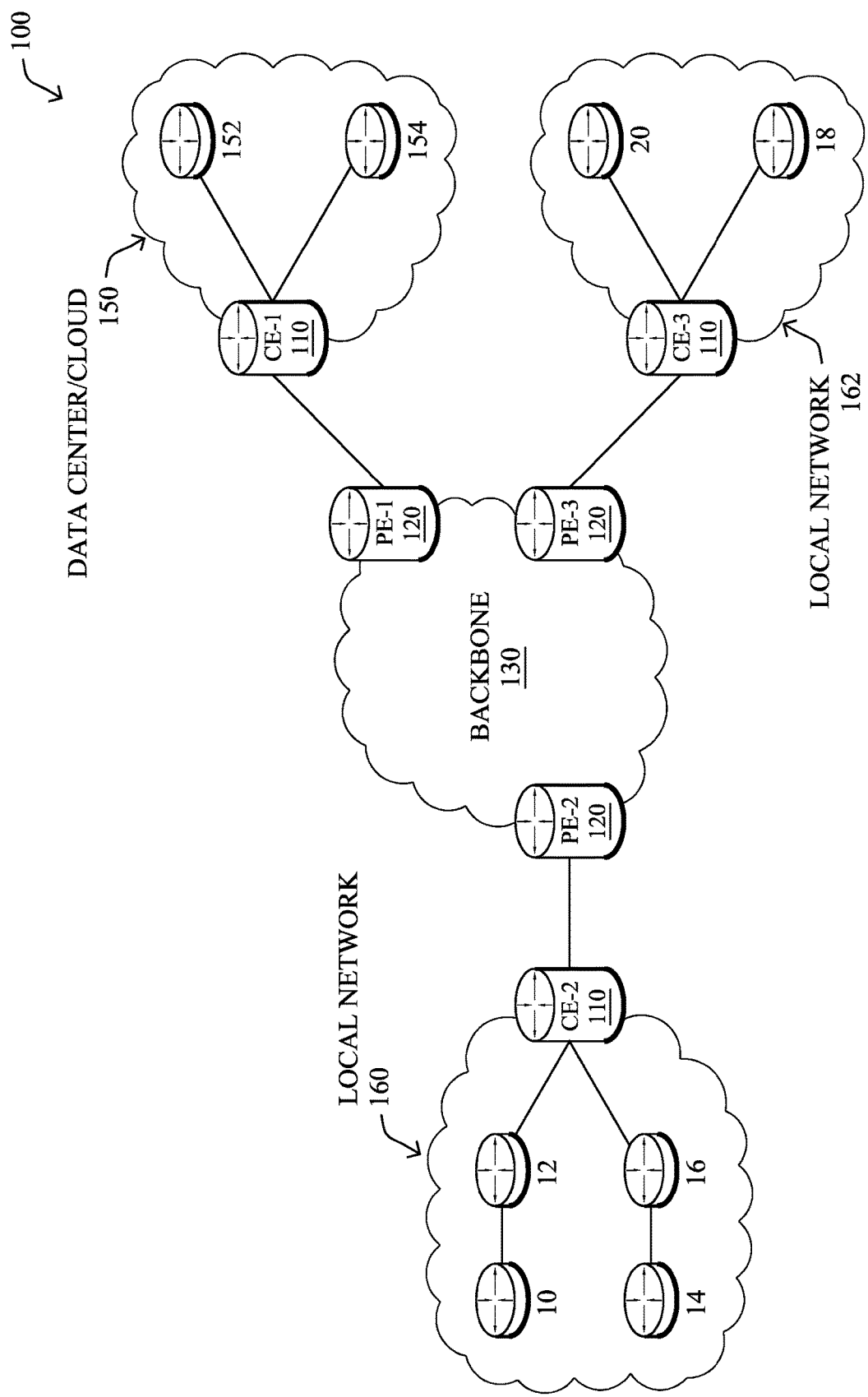

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
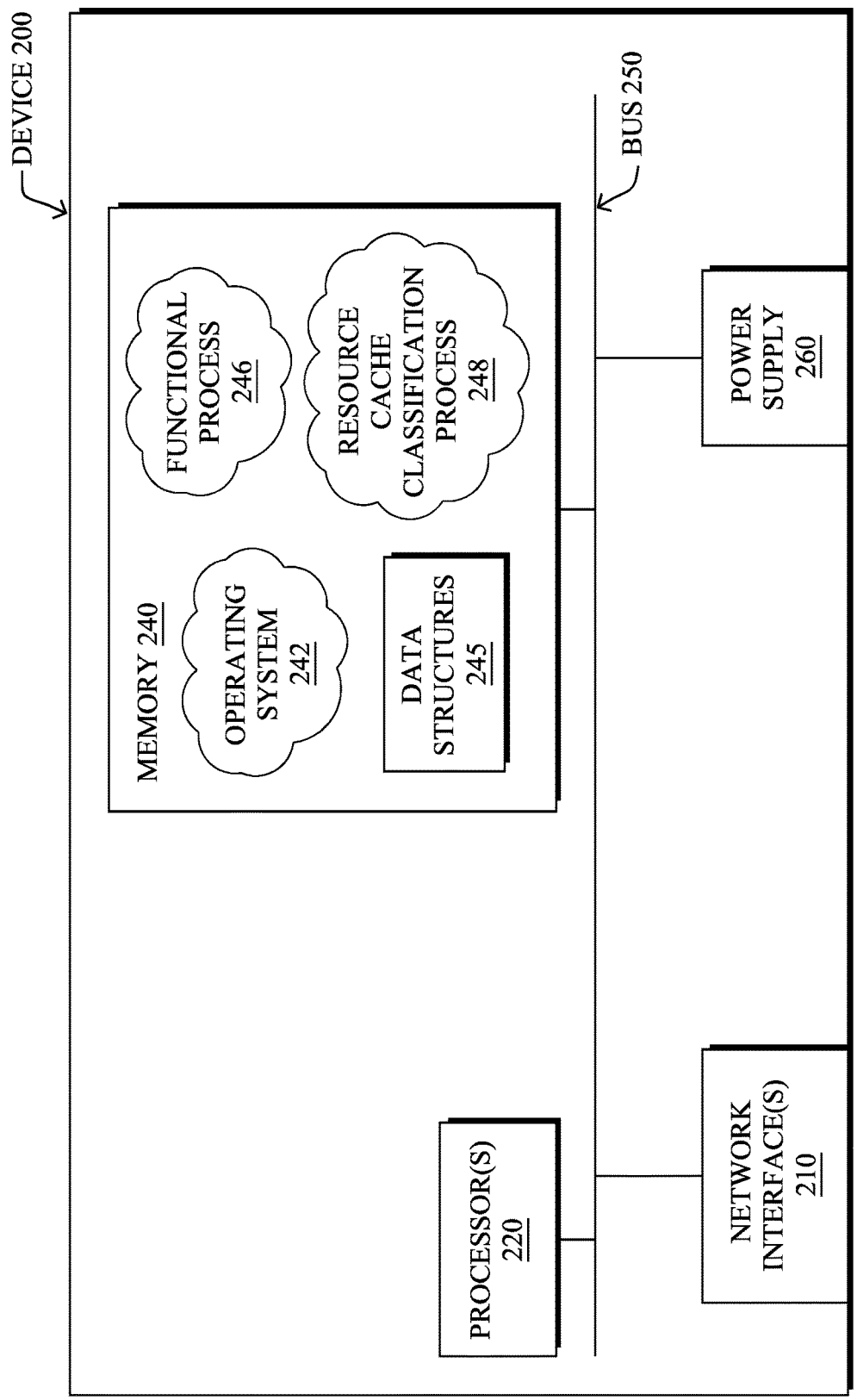
FIG. 2 illustrates an example computing device/node.

FIG. 2 is a schematic block diagram of an example computing device 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "resource cache classification" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Application Intelligence Platform—

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. For example, each node can include one or more machines that perform part of the applications. The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
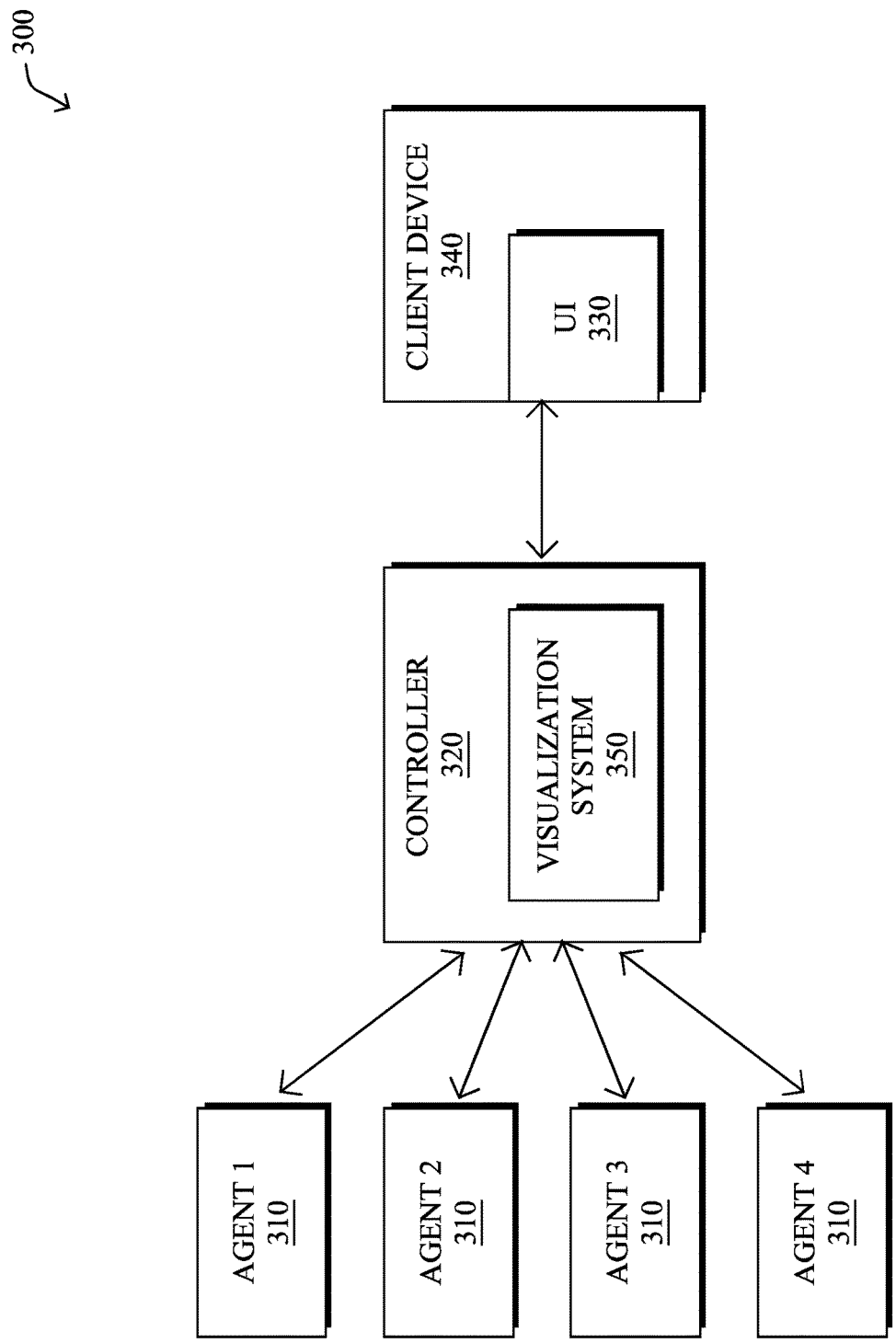
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premise (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Browser agents and mobile agents are generally unlike other monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to an HTTP payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
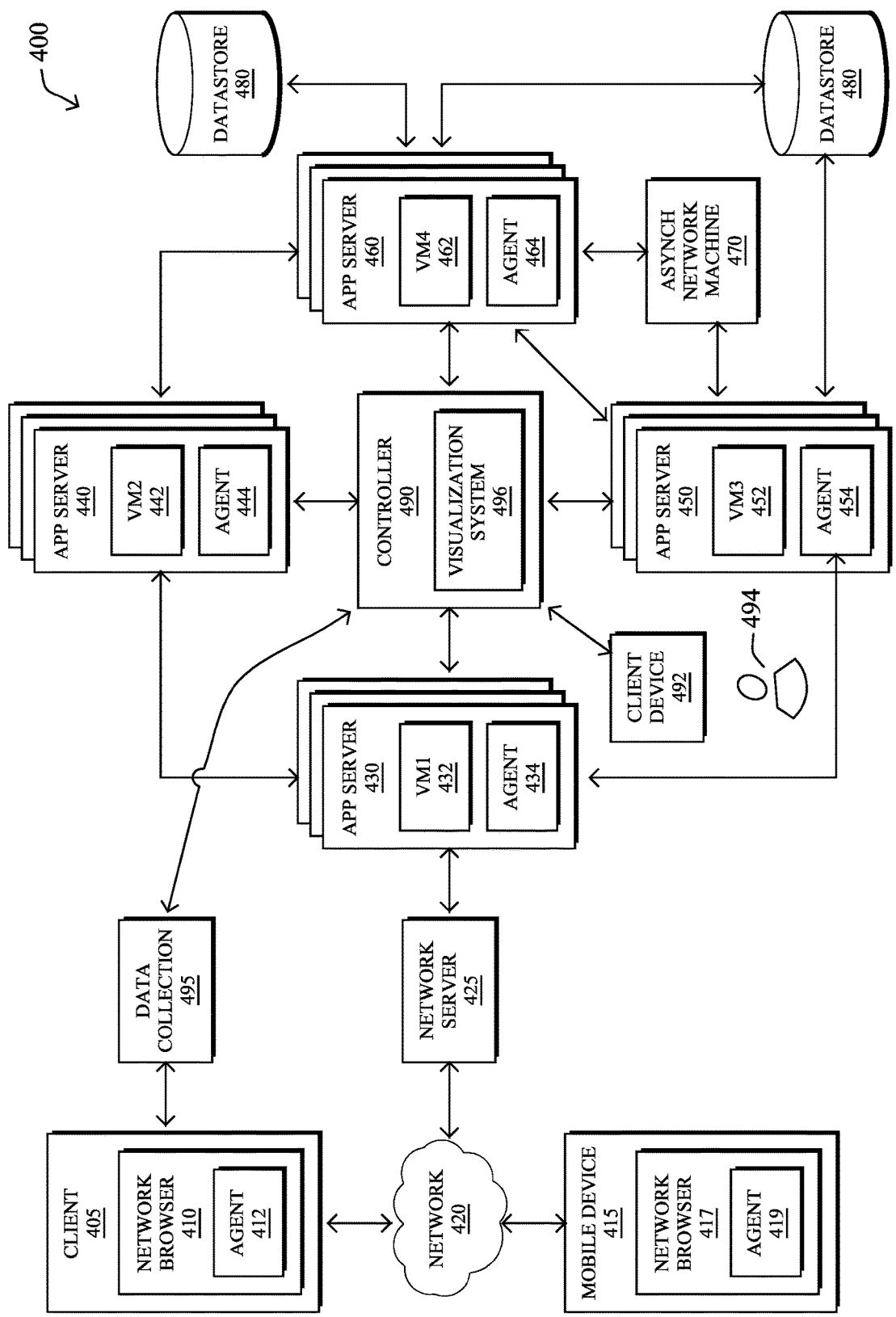
FIG. 4 illustrates an example system for an application-aware intrusion detection system.

FIG. 4 illustrates an example application intelligence platform (system) 400 for performing one or more aspects of the techniques herein. The system 400 in FIG. 4 includes client device 405 and 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 460, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may repot data to data collection server 460 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 and one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 3). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when a data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 450. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 460. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client computer 492 may communicate with controller 390 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
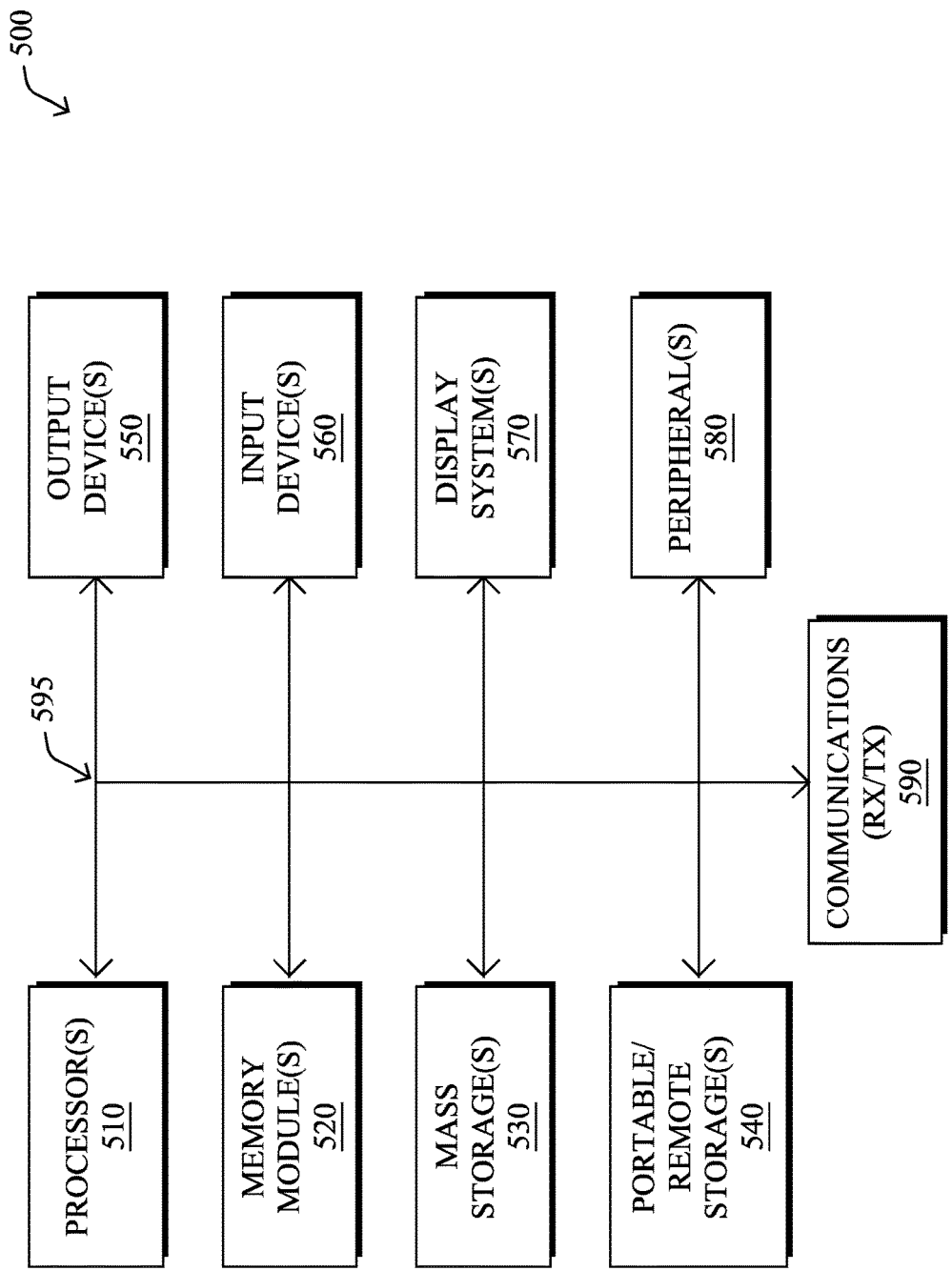
FIG. 5 illustrates an example computing system implementing the disclosed technology.

FIG. 5 is a block diagram of a computer system 500 for implementing the present technology, which is a specific implementation of device 200 of FIG. 2 above. System 500 of FIG. 5 may be implemented in the contexts of the likes of clients 405, 492, network server 425, servers 430, 440, 450, 460, a synchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processors 510 and memory 520. Main memory 520 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multiprocessor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

—Resource Cache Classification—

As noted above, a web browser, while rendering a web page, fetches its resources (e.g., css, javascript, images, etc.) either over the network or from its local cache. However, due to security concerns as well as limitations in certain web browsers, it can be difficult to determine whether a resource is being fetched from the browser's cache or not. Accordingly, this lack of visibility makes it correspondingly difficult to detect and manage inefficiencies in resource caching.

The techniques herein, therefore, propose a mechanism for resource cache classification using machine learning. In particular, as described below, the techniques herein provide an approach (e.g., a heuristic approach) to determine whether a browser resource is fetched from local cache or not (i.e., retrieved from a web server) for all scenarios, and to do so with a high degree of accuracy.

Specifically, according to one or more embodiments herein, techniques herein determine a plurality of resources loaded during rendering of a web page on a client device, and determine a duration of time taken for each of the plurality of resources to fully load. Accordingly, the techniques herein may then cluster the plurality of resources into clusters, comprising a first cluster consisting of resources having the shortest durations of the plurality of resources and a second cluster consisting of resources having the longest durations of the plurality of resources. Those resources of the first cluster may then be classified as cached resources, while those resources of the second cluster may be classified as non-cached resources. In one specific embodiment, clustering the plurality of resources into clusters further comprises a third cluster consisting of resources of the plurality of resources having durations between the shortest durations and the longest durations, and the techniques herein may thus also classify those resources of the third cluster as unclassified resources.

Illustratively, the techniques described herein may be performed by hardware, software, and/or firmware, such as in accordance with the illustrative resource cache classification process 248, which may include computer executable instructions executed by the processor 220 to perform functions relating to the techniques described herein, e.g., in conjunction with corresponding processes of other devices in the computer network as described herein.

Operationally, the techniques herein illustratively provide for client-side monitoring of web page rendering, where a client agent process (e.g., a java script agent file) monitors page rendering, obtains performance data, and sends the end-user data to centralized servers (e.g., controller 490) for resource cache classification. (Note that in an alternative embodiment, the classification can also be done at the client side, itself.)

Figure 6:
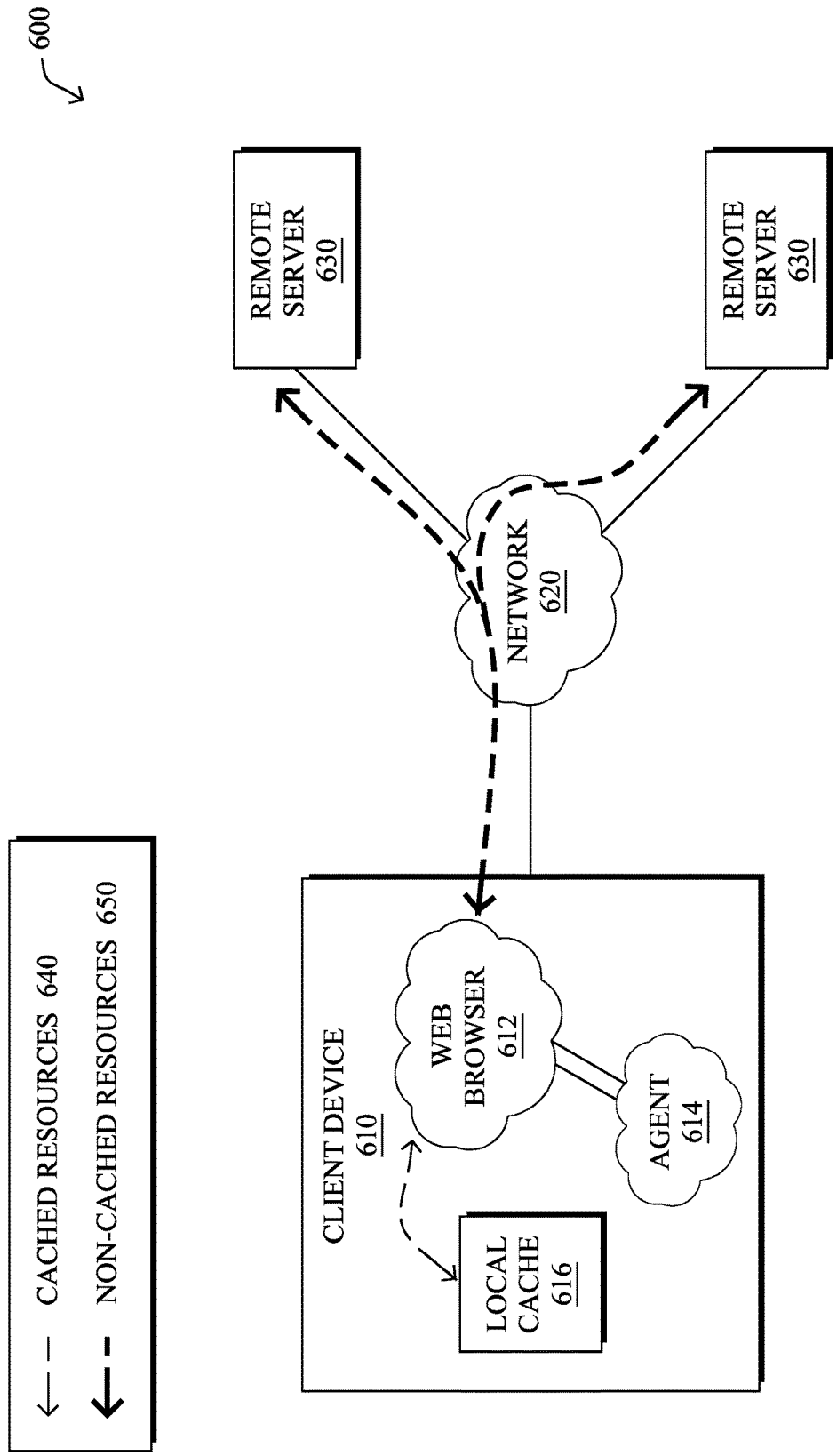
FIG. 6 illustrates an example of resource caching.

FIG. 6 illustrates an example of resource caching in an illustrative (and simplified) environment 600, where a client device 610 has a web browser 612 that is configured to load and render web pages through the network 620 that are served by one or more remote servers 630. As an example, a web page may have 80-100 resources that need to be loaded and rendered (e.g., java scripts, cascading style sheets (CSS), images, ad content, etc.). As will be understood by those skilled in the art, once resources of a web page have been retrieved during a web page rendering, then such resources may be cached in a local cache 616 for faster loading and rendering in the future if those same resources are used again. In this manner, any web page rendering by a web browser 612 may consist of any combination of both cached resources 640 from local cache 616, or non-cached resources 650 from one or more remote servers 630.

The techniques herein illustratively use an additional feature of the application intelligence platform above, where a web browser agent 614 (e.g., agents 412/419 above) provides a "Resource Timing API", which exposes details about resources loaded in a page. For instance, a web page monitored by the application intelligence platform herein may report performance data (e.g., time to load, location of resources (country/region), client device, client browser, etc.) about the page and its resources. Said differently, a web browser 612 often makes the performance data of a page's resources available to an agent 614 through its support of the Resource Timing API, and using the Resource Timing API, details about every resource's connection time, duration, size, etc., can be obtained.

As noted above, a resource may either be served from the browser's cache 616 or fetched over a network 620 (servers 630). Though in certain situations it may be determined that a resource is fetched from cache (or not) based on a file transfer size attribute (e.g., using an illustrative "transferSize" field of the Resource Timing API), many situations do not allow for this functionality. For instance, the transferSize field is only available in recent browser versions (since 2016), so for browsers older than this (before 2016), there is no way to determine caching using Resource Timing API. Even still, a resource can either be a same-origin resource or a cross-origin resource. For a same origin resource, if transferSize is 0, then that resource is definitely cached. For a cross origin resource, however, the Resource Timing API may not be able to provide the actual transferSize (it always reports it as zero, for security, or other reasons), and hence the transferSize field cannot always determine if the resource was cached or not. (The proportional contribution of cross origin resources in typical web sites can be more than 50%).

As a part of end-user monitoring for the application intelligence platform, the techniques herein are aimed at bringing visibility to how effective the browser's cache is. Accordingly, a heuristic approach is defined herein to determine whether a resource was fetched from the cache or not, irrespective of the fact that it may be served from cross origin servers or that the browser version is not up-to-date (e.g., before 2016).

Figure 7:
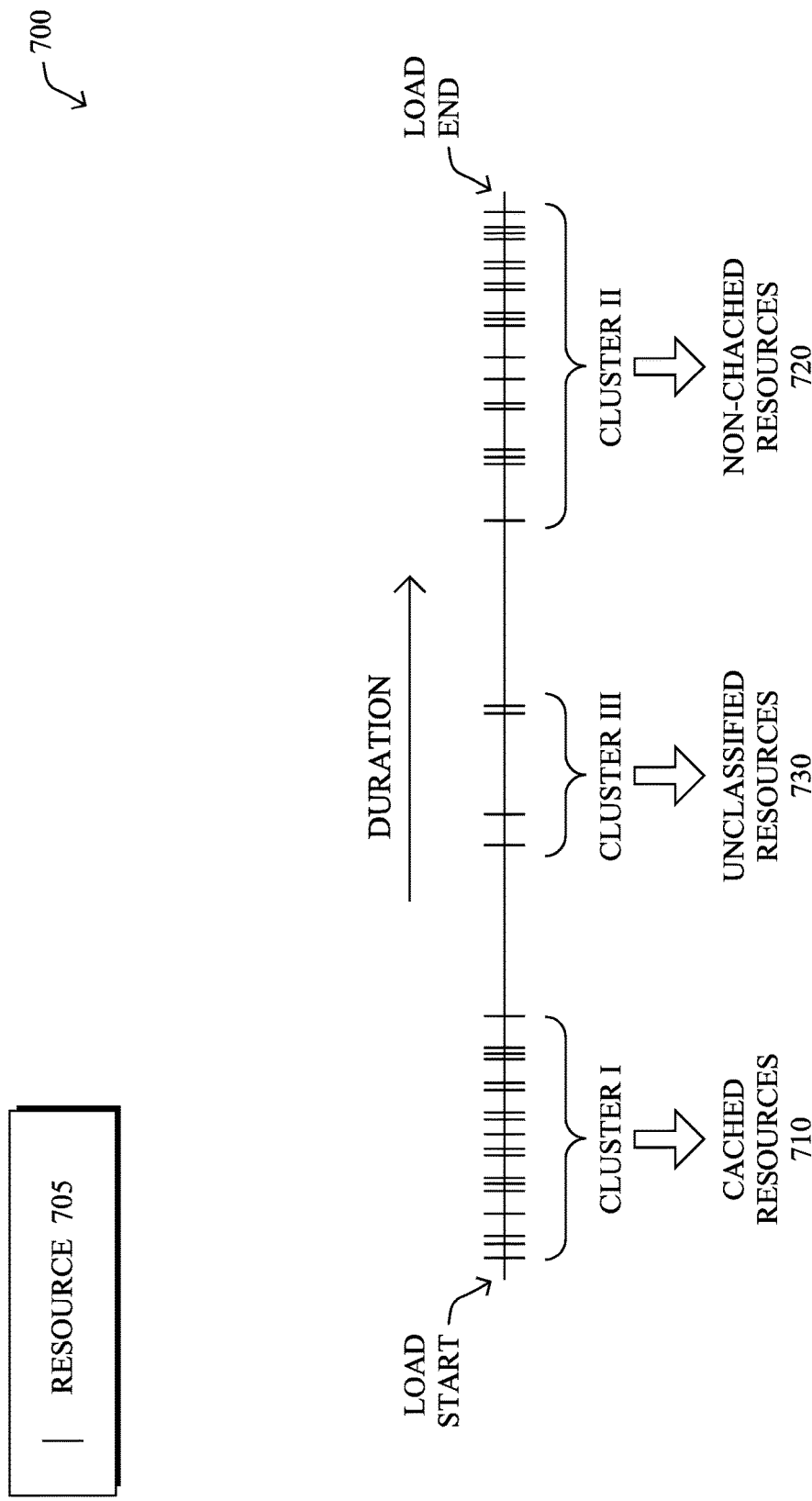
FIG. 7 illustrates an example of resource cache classification using machine learning.

Using various monitoring tools, such as the illustrative Resource Timing API, the system herein can obtain the "duration" (time to load) of each resource. FIG. 7 illustrates an example resource loading timeline 700 (from "load start"

to "load end"), showing an example duration timing of various resources 705 (notably not to scale: merely an example representation for visualization). For instance, each resource mark on the timeline 700 represents the duration/load time of that particular resource 705 during rendering of the web page. In particular, though resources are generally loaded in the order they are specified in the web page, the timeline 700 of FIG. 7 represents the resources being then sorted according to their load durations, illustrating an example occurrence of load time clusters.

According to the techniques herein, these durations (taken from this single web page rendering) are then classified into two or three illustrative clusters using machine learning techniques (like KMeans++, Jenks Natural Breaks, Kernel Density Estimation, etc.). The first cluster, "Cluster I", contains the resources which have the least/shortest durations. Conversely, a second cluster, "Cluster II", contains resources which have the largest/longest durations. Resources fetched from a local cache 614 tend to have smaller duration values that are close to each other and are very likely to form a cluster. Similarly, resources fetched over the network 620 from remote servers 630 have higher duration values and tend to form the other cluster. As such, the techniques herein may then classify resources in Cluster I (the shorter durations) as cached resources 710 (640), while resources in Cluster II (the longer durations) may be classified as not being cached (non-cached resources 720/650).

Optionally, classifying resources into three clusters achieves a higher accuracy than only the two clusters above. In particular, the third cluster ("Cluster III") contains unclassified resources 730 for which it is uncertain whether they are cached/not cached. The percentage of resources in this cluster is often very low, and also helps in increasing the accuracy of the solution, since otherwise the resources with these ambiguous durations (between the shortest and the longest durations) may result in misclassification.

Notably, the heuristic approach herein does not depend on large training data sets, and instead works on a single resource snapshot of a page. That is, using a single snapshot to do the classification avoids the needs to create large training sets, and is based on the premise that a single resource snapshot is the smallest volume of data that is affected by the same environmental factors like latency, bandwidth, browser, browser version, hardware, etc.

Furthermore, according to the techniques herein, the heuristic also distinguishes between a first time visit (in which case very few, if any, resources may be fetched from cache) and a repeat visit (resources being fetched from cache). That is, since during a first time visit, all resources may be remotely fetched, and as such, clustering the durations into groups based on duration would falsely find comparatively shorter durations and longer durations, potentially misclassifying the shorter durations as cached. As such, the techniques herein may define a threshold ("T") for each browser type. If the number of resources whose duration is <T (e.g., 20 ms) is less than a given percentage (e.g., 10%), then a page may be classified as a first time visit, and all resources may be marked as not cached. Other heuristics for determining whether the web page is a first time visit may be used, and this is merely one example technique.

In certain embodiments herein, the performance data (duration, cached vs. not cached, etc.) may be displayed on a dashboard (GUI) for administrator assessment and adjustment. For instance, the techniques herein can delineate which resources are cached from those that are not on a per-user basis, on a per-page basis, on a per-domain basis, on a per-browser basis, and so on. Also, the specific resources may be listed, or else various indications may be displayed (e.g., cache percentages, max/min/average caching rates, various "health levels" or status indications such as color changes, size changes, and so on based on expected cache rates, etc.). Based on this information, an administrator, or an intelligent dynamically programming controller, can change certain features of the web page design (e.g., changing cache headers) or browser design (e.g., cache size, caching algorithms, etc.) in order to achieve different cache rates.

Figure 8:
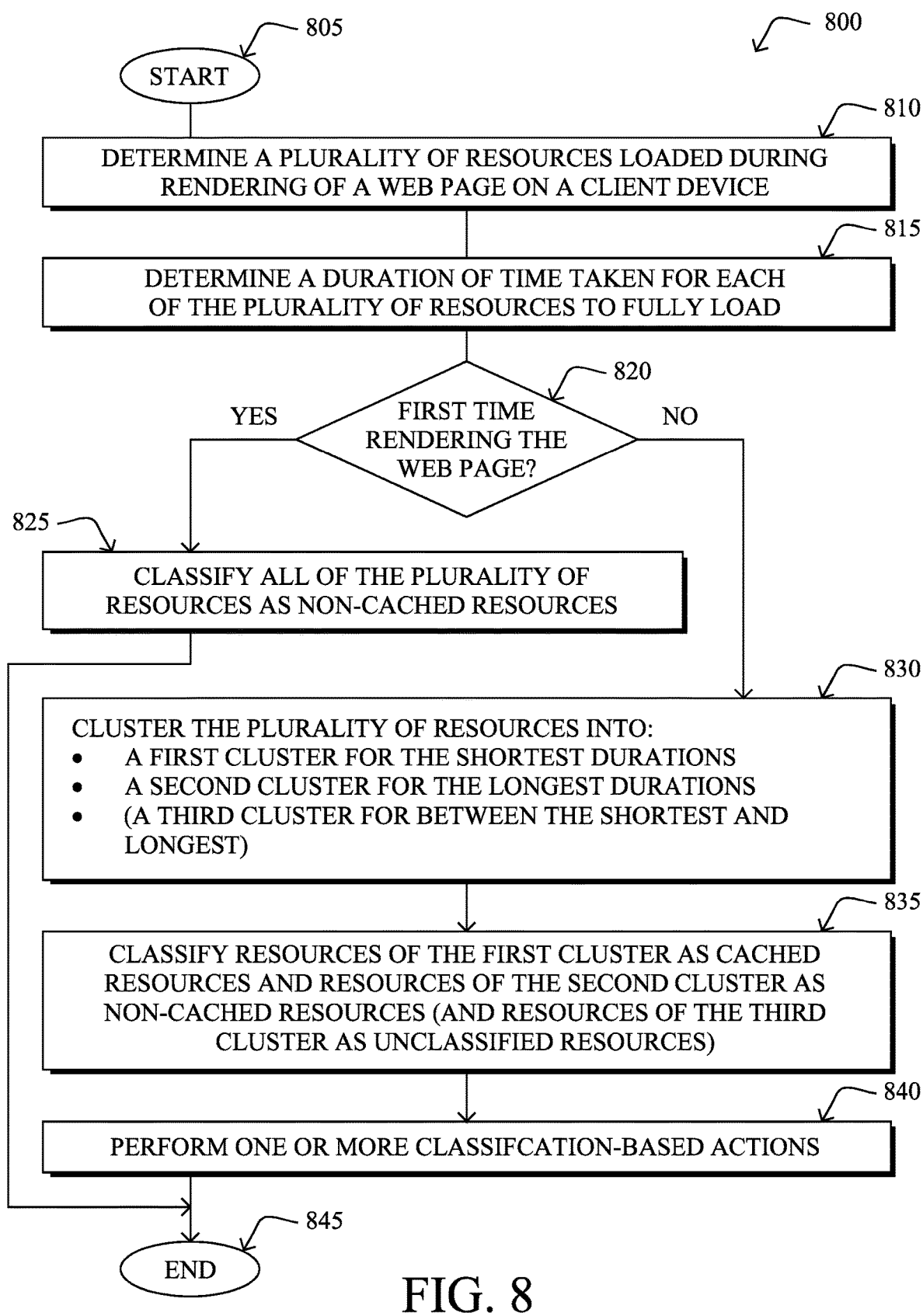
FIG. 8 illustrates an example simplified procedure for resource cache classification using machine learning.

FIG. 8 illustrates an example simplified procedure 800 for resource cache classification using machine learning in accordance with one or more embodiments described herein. For example, a non-generic, specifically configured device (e.g., device 200) may perform procedure 800 by executing stored instructions (e.g., process 248). Specifically, when, in step 805, a web page is rendered on a client device, then the procedure continues to step 810 where the device (e.g., controller 490) determines a plurality of resources loaded during the rendering of the web page on a client device (e.g., both same-origin and cross-origin resources), and also a duration of time taken for each of the plurality of resources to fully load in step 815. As an illustrative example, a local web browser agent 614 (412/419) may capture the desired information (resources and/or duration), and relays it to the controller 490 for further processing.

In step 820, it is important to determine whether the rendering of the web page is the first time the web page is rendered on the client device. As described above, this determination may be made in response to determining that a given percentage of the plurality of resources have a duration greater than a given threshold (or, conversely, that a reciprocal percentage of the plurality of resources have a duration less than the given threshold, thus simply referred to as "beyond a threshold"). As mentioned above, the given threshold may be specifically based on which web browser performs the rendering of the web page.

Where it is most likely the first time a web page is being rendered on the client device, the procedure may classify all of the plurality of resources as non-cached resources in step 825 (i.e., as opposed to trying to cluster resource durations when in all likelihood, all or most of the resources are actually being fetched from remote servers).

On the other hand, when the rendering is not the first time on the client device, then in step 830 the techniques herein cluster the plurality of resources into clusters (e.g., based on a machine learning algorithm), which as mentioned above illustratively comprise:
- a first cluster consisting of resources having the shortest durations of the plurality of resources;
- a second cluster consisting of resources having the longest durations of the plurality of resources; and preferably (though optionally)
- a third cluster consisting of resources of the plurality of resources having durations between the shortest durations and the longest durations.

After the resources have been clustered based on duration, then in step 835 the techniques herein classify the resources according to their corresponding cluster. That is, illustratively, those resources of the first cluster may be classified as cached resources, those resources of the second cluster may be classified as non-cached resources, and if so configured (e.g., for greater confidence in the first and second clusters), those resources of the third cluster may be classified as unclassified resources (i.e., uncertain as to either being a cached or non-cached resource).

As described in greater detail above, in step 840 one or more classification-based actions may be performed. As one example, the techniques herein may determine a proportion of cached resources and non-cached resources and display the proportion within a web page performance dashboard (GUI). In another example, the techniques herein may correlate a plurality of snapshots of renderings of the web page from a plurality of client devices, and may generate a report on cached and non-cached resources across the plurality of snapshots of renderings of the web page. For instance, different correlations between cached and non-cached resources may be made herein (e.g., based on particular business transactions, nodes, web browsers, etc.), and also different visualizations may be made, such as in a GUI or other reporting data structure. Other examples, such as dynamically changing caching headers in order to achieve different caching results may also be performed, whether by the controller or an administrator.

In still further embodiments of the techniques herein, a business impact of caching/non-caching can also be quantified. That is, because of the proportion of cached to non-cached resources, various business transactions may have been correspondingly affected (e.g., online purchases were delayed, page visits were halted before fully loading, user satisfaction or dwell time decreased, etc.). The techniques herein, therefore, may compare different proportions (e.g., from different client devices, different web browsers, etc.) to show any affect (e.g., value lost, transactions lost, visits missed, revenue difference, etc.) due to the caching behavior of the web page on various client devices.

The simplified example procedure 800 may then end in step 845, notably with the option to continue monitoring further page loads.

It should be noted that certain steps within procedure 800 may be optional as described above, and the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Moreover, the procedure 800 is described from one example perspective (e.g., from the perspective of a server/controller 490), however reciprocal actions of participating devices may be understood from the description above (e.g., from the perspective of a network browser agent 412/419). Also, as mentioned herein, though one example embodiment performs the clustering and classifying at the server/controller 490, other embodiments (e.g., where suitable processing capability is available) may shift the responsibility of various actions to other devices/agents, which may then be locally reported and/or reported to a centralized server for further processing and correlation.

The techniques described herein, therefore, provide for resource cache classification using machine learning. In particular, the techniques herein provide valuable insight into browser resource caching, and specifically whether a resource is fetched from local cache or not, regardless of the web browser used or privacy levels set, and does so with a high degree of accuracy. For example, in field tests, the techniques herein have achieved an accuracy of 95% or higher, where less than 10% of the resources were placed within the unclassified cluster. The techniques herein thus reliably provide a tool for detecting and reporting inefficiencies in resource caching, which may then be managed by the server/controller or else otherwise attended to by a network/application administrator. Such a tool enhances the end-to-end monitoring capabilities of the example application intelligence platform above.

While there have been shown and described illustrative embodiments that provide for resource cache classification using machine learning, it is to be understood that various other adaptations and modifications may be made within the spirit and scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any invention or of what may be claimed, but rather as descriptions of features that may be specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments is herein.

What is claimed is:

1. A method, comprising:
determining, by a processor, a plurality of resources loaded during rendering of a web page on a client device;
determining, by the processor, a duration of time taken for each of the plurality of resources to fully load;
clustering, by the processor, the plurality of resources into clusters, comprising:
a first cluster consisting of resources having the shortest durations of the plurality of resources; and
a second cluster consisting of resources having the longest durations of the plurality of resources;
classifying, by the processor, those resources of the first cluster as cached resources; and
classifying, by the processor, those resources of the second cluster as non-cached resources.

2. The method as in claim 1, wherein clustering the plurality of resources into clusters further comprises a third cluster consisting of resources of the plurality of resources having durations between the shortest durations and the longest durations, the method further comprising:
classifying those resources of the third cluster as unclassified resources.

3. The method as in claim 1, further comprising:
determining that the rendering of the web page is the first time the web page is rendered on the client device; and
classifying all of the plurality of resources as non-cached resources in response to the rendering of the web page being the first time the web page is rendered on the client device.

4. The method as in claim 3, wherein determining that the rendering of the web page is the first time the web page is rendered on the client device is in response to:
determining that a given percentage of the plurality of resources have a duration beyond a given threshold.

5. The method as in claim 4, wherein the given threshold is based on which web browser performs the rendering of the web page.

6. The method as in claim 1, further comprising:
determining a proportion of cached resources and non-cached resources; and
displaying the proportion within a web page performance dashboard.

7. The method as in claim 1, further comprising:
correlating a plurality of snapshots of renderings of the web page from a plurality of client devices; and
generating a report on cached and non-cached resources across the plurality of snapshots of renderings of the web page.

8. The method as in claim 1, wherein the plurality of resources comprise both same-origin and cross-origin resources.

9. The method as in claim 1, wherein clustering the plurality of resources into clusters is based on a machine learning algorithm.

10. A tangible, non-transitory, computer-readable medium storing program instructions that cause a computer to execute a process comprising:
determining a plurality of resources loaded during rendering of a web page on a client device;
determining a duration of time taken for each of the plurality of resources to fully load;
clustering the plurality of resources into clusters, comprising:
a first cluster consisting of resources having the shortest durations of the plurality of resources; and
a second cluster consisting of resources having the longest durations of the plurality of resources;
classifying those resources of the first cluster as cached resources; and
classifying those resources of the second cluster as non-cached resources.

11. The computer-readable medium as in claim 10, wherein clustering the plurality of resources into clusters further comprises a third cluster consisting of resources of the plurality of resources having durations between the shortest durations and the longest durations, the process further comprising:
classifying those resources of the third cluster as unclassified resources.

12. The computer-readable medium as in claim 10, the process further comprising:
determining that the rendering of the web page is the first time the web page is rendered on the client device; and
classifying all of the plurality of resources as non-cached resources in response to the rendering of the web page being the first time the web page is rendered on the client device.

13. The computer-readable medium as in claim 12, wherein determining that the rendering of the web page is the first time the web page is rendered on the client device is in response to:
determining that a given percentage of the plurality of resources have a duration beyond a given threshold.

14. The computer-readable medium as in claim 13, wherein the given threshold is based on which web browser performs the rendering of the web page.

15. The computer-readable medium as in claim 10, the process further comprising:
determining a proportion of cached resources and non-cached resources; and
displaying the proportion within a web page performance dashboard.

16. The computer-readable medium as in claim 10, the process further comprising:
correlating a plurality of snapshots of renderings of the web page from a plurality of client devices; and
generating a report on cached and non-cached resources across the plurality of snapshots of renderings of the web page.

17. The computer-readable medium as in claim 10, wherein the plurality of resources comprise both same-origin and cross-origin resources.

18. The computer-readable medium as in claim 10, wherein clustering the plurality of resources into clusters is based on a machine learning algorithm.

19. An apparatus, comprising:
one or more network interfaces configured to communicate in a computer network;
a processor coupled to the network interfaces and adapted to execute one or more processes; and a memory configured to store a process executable by the processor, the process when executed operable to:
　　determine a plurality of resources loaded during rendering of a web page on a client device;
　　determine a duration of time taken for each of the plurality of resources to fully load;
　　cluster the plurality of resources into clusters, comprising:
　　　　a first cluster consisting of resources having the shortest durations of the plurality of resources; and
　　　　a second cluster consisting of resources having the longest durations of the plurality of resources;
　　classify those resources of the first cluster as cached resources; and
　　classify those resources of the second cluster as non-cached resources.

20. The apparatus as in claim 19, wherein clustering the plurality of resources into clusters further comprises a third cluster consisting of resources of the plurality of resources having durations between the shortest durations and the longest durations, wherein the process when executed is further operable to:
　　classify those resources of the third cluster as unclassified resources.

21. The apparatus as in claim 19, wherein the process when executed is further operable to:
　　determine that the rendering of the web page is the first time the web page is rendered on the client device; and
　　classify all of the plurality of resources as non-cached resources in response to the rendering of the web page being the first time the web page is rendered on the client device.

* * * * *

UNITED STATES PATENT AND TRADEMARK OFFICE
CERTIFICATE OF CORRECTION

PATENT NO. : 10,650,079 B2
APPLICATION NO. : 15/800202
DATED : May 12, 2020
INVENTOR(S) : Shubham Jindal et al.

Page 1 of 1

It is certified that error appears in the above-identified patent and that said Letters Patent is hereby corrected as shown below:

In the Specification

Column 21, Line 9, should read:
embodiments herein.

Signed and Sealed this
Fifteenth Day of September, 2020

Andrei Iancu
*Director of the United States Patent and Trademark Office*